Sept. 26, 1967     H. E. BOWERMAN     3,343,561

PIPELINE BALL AND METHOD OF MAKING

Filed May 28, 1964     4 Sheets-Sheet 1

INVENTOR
Hulie E. Bowerman

BY

ATTORNEY

INVENTOR
Hulie E. Bowerman

BY

ATTORNEY

Sept. 26, 1967      H. E. BOWERMAN      3,343,561
PIPELINE BALL AND METHOD OF MAKING Filed May 28, 1964      4 Sheets-Sheet 3

INVENTOR
Hulie E. Bowerman

BY *(signature)*

ATTORNEY

Sept. 26, 1967  H. E. BOWERMAN  3,343,561
PIPELINE BALL AND METHOD OF MAKING

Filed May 28, 1964  4 Sheets-Sheet 4

INVENTOR
Hulie E. Bowerman

BY

ATTORNEY

United States Patent Office 3,343,561
Patented Sept. 26, 1967

3,343,561
PIPELINE BALL AND METHOD OF MAKING
Hulie E. Bowerman, 904 Meadow Oaks Drive,
Arlington, Tex. 76010
Filed May 28, 1964, Ser. No. 371,004
6 Claims. (Cl. 137—268)

This invention relates to hollow, valved elastomeric go-devils and to methods of making them to provide specialized body and valve structures by which the internal pressure within the body can be controlled, this invention having particular utility in connection with go-devils intended to be used in fluid pipelines carrying batches of chemicals, gasoline, oil, natural gases, etc.

It is common practice to transport liquid and gaseous fuels and other chemicals in pipelines over great distances, for instance between oil fields and consumer areas, and to transport different fluids in the same pipeline in serially flowing batches. There are a number of reasons for sending go-devils through such pipelines along with the fluids being transported. For example, when fluids flow in a pipeline, the velocity at the center of the cross-sectional flow is greatest and the velocity decreases almost to zero at the surface of the pipe; but if spaced go-devils are introduced in the pipeline to move with the fluid and keep the fluid near the surface of the pipe moving, the total volume of flow inside the pipe can be greatly increased.

These go-devils also are useful in processes of applying coatings, such as noncorrosive or other liner materials to the inner surfaces of pipes, and in addition are particularly advantageous when used to clean the inner surfaces of a pipe by wiping contact therewith which dislodges deposits and corrosion. Moreover, since it is customary to transport batches of different fluids in immediate succession in the pipeline, the go-devils serve as batch-separators to keep the different fluids from intermingling to a significant degree. These practices are well known in the pipeline art which also teaches many structures and techniques for introducing go-devils, often in the form of elastomeric balls, into and retrieving them from the pipelines.

Some of the pipelines are very large in diameter, 36 or more inches, and therefore it is impractical to manufacture or to use balls which have solid centers or cores, which solid cores would also greatly reduce the ability of the balls to distort and flow into elongated shapes which may be necessary to permit them to pass through restrictions in the pipelines. On the other hand, when a hollow ball is used which is filled with air, the outside diameter of the ball varies to a greater or lesser extent depending on various pipeline fluid pressures encountered during flow through different pipelines, or inside different zones of the same pipeline. If a ball shrinks in diameter it cannot do its job with optimum efficiency; if it swells up, it may become stuck and, in any case, will undesirably impede the flow of fluid through the pipeline. One solution to the problem lies in filling the ball with a liquid such as water so as to leave the ball free to distort its shape, but with greatly reduced tendency to shrink or to swell up in the presence of different pipeline pressures.

It is a principal object of this invention to provide an improved pipeline go-devil structure incorporating improved valving and duct means through which the go-devil may be filled, emptied, vented or pressurized as anticipated pipeline operating conditions may require.

It is an important object of this invention to provide a pipeline go-devil having a hollow interior to which access is obtained by inserting a hollow needle through the valve structure; and especially to provide a valve structure which is elastomeric in construction, and is sufficiently resilient that the valve can be distorted or bent during passage of the go-devil through the pipeline without damaging the valve.

It is another important object of the invention to provide a valve structure made entirely of elastomeric material which is bonded to the elastomeric material of which the go-devil is made in such a manner that no weak spots result which might tend to cause the go-devil to blow out or tear during and immediately after its use in a pipeline.

In view of the fact that the pipeline go-devils may be used in pipelines having extremely high fluid pressures, it is possible for the ball to encounter a condition during its travel wherein the pressure outside of the go-devil or ball is very much greater than the pressure inside the ball. It is therefore an important object of this invention to provide a novel combination of two resilient valve structures together which are fluid-tight in both directions so as to prevent not only the escape of fluid from within the ball, but also to prevent the entrance of fluid into the ball when the outside pressure greatly exceeds the inside pressure. Therefore, the present structure is in the nature of two check valves facing in opposite directions so as to prevent undesired transfer of fluid in either direction, and these oppositely facing check valves being simultaneously openable by insertion of a hollow needle therethrough. The present valve arrangements are of the type including elongated conoidal elastic portions which have been pierced by a needle to form a duct which is collapsed by fluid pressure forces acting externally upon the elongated portions and substantially surrounding same. Individually, valves of this general type are not, per se, novel since they are suggested in Patent 2,700,980 and in Patent 2,935,320, for example.

It is still another object of this invention to provide drainage duct means coupled internally to the valve structure and having a tube extending substantially to the inner surface of the hollow ball so that substantially all liquid therein can be drained out despite the protrusion of the valve neck into the hollow of the ball beyond its wall.

It is another major object of the invention to provide novel methods of manufacturing a valved go-devil including all or some of the following steps: The first step is the molding of the necessary resilient elements including two or more shell sections which can later be joined to form a complete shell, the molding of several small resilient valve parts, and the forming of a drainage duct tube. These parts are then assembled with bonding liquid applied to appropriate elastomer surfaces which must be united to provide the opposed-check valve structure. When the drainage duct and valve structure parts have been united in at least one of the shell sections of which the go-devil is to be made, the shell sections are then united. A needle is inserted through the valve structure and most of the air is evacuated from within the ball. The needle is then removed and the ball is preferably inserted in a confining mold where it is subjected to heat for the purpose of finally curing the bonds.

The outer surface of the go-devil can subsequently be pierced by small needles which are insufficient in length to pass all the way through the shell, these perforations serving as vents for voids which may be located within the ball, this body venting serving the purpose set forth in my Patent No. 3,036,339.

Other objects and advantages of the invention will become apparent during the following discussion of the drawings, wherein.

Figure 22:
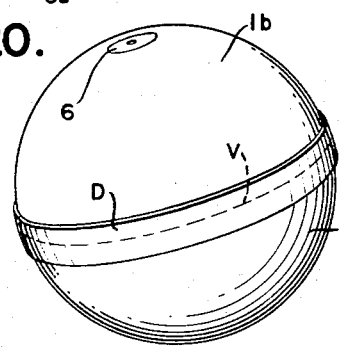
FIG. 22 shows the shell sections united.
Figure 23:
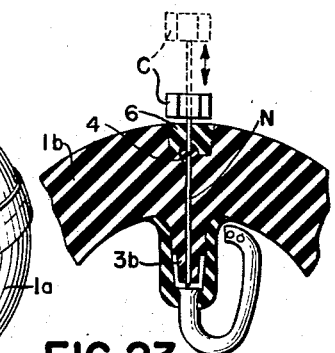
Figure 24:
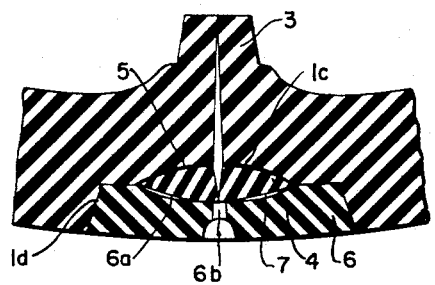
Figure 25:
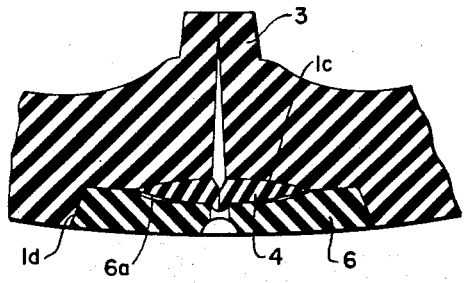
Figure 26:
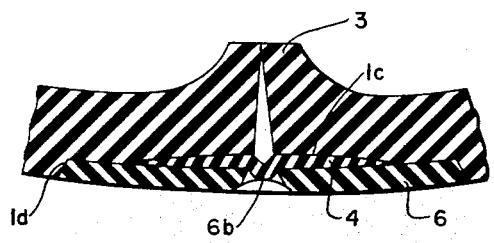

FIG. 23 is a view partly in section and showing a portion of the ball of FIG. 22 enlarged and pierced by a needle which is passed through the entire valve assembly to create a self-closing slit-like opening therein suitable for receiving a hollow inflating needle; and FIGS. 24, 25, and 26 are partial sectional views taken through a modified form of valve assembly and showing the shape of such assembly as the ball is inflated to increasing greater pressures causing successively greater distortions.

Referring now to the first nine figures of the drawings representing illustrative structural details, it will be seen that the go-devil ball 1 comprises an elastomeric body including two half-shell sections 1a and 1b united along a plane U and having a hollow center 1h.

Figure 3:
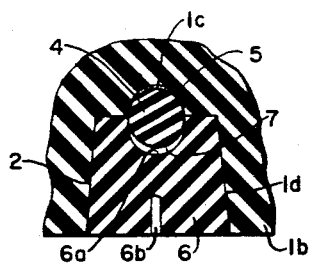
FIG. 3 is an enlarged section view taken through an outer check valve assembly after it is assembled, but before it is pierced.

At least one of the sections supports a valve assembly including an outer check valve 2 functioning to prevent the entry of fluid into the ball and an inner check valve 3 functioning to prevent the passage of fluid within the ball to a point outside thereof. The details of the check valves 2 and 3 can best be seen in FIGS. 3 and 4. The outer valve assembly 2 includes a socket 1d having a recess 1c which is hemispherical and which receives the small spherical check valve element 4. This element is bonded to this recess in the vicinity of the heavy line 5 so that when the go-devil is subjected to final curing, the element 4 will in effect become part of the shell 1b and comprise a small conoidal finger extending part-way outwardly of the socket 1d. A plug 6 is provided to fill the socket, and this plug has a recess 6a in its inner surface, but this recess is somewhat deeper than hemispherical so as to allow a small space 7 between the outer surface of the element 4 and the surface of the recess 6a. In this way, there is assurance that the element 4 will not become bonded to the plug 6. The plug is a tight fit in the socket 1d in the outer surface of the ball shell 1b and the plug 6 is bonded to the shell 1b wherever it is in contact therewith. The plug has a small central bore 6b which guides the piercing needle when it first enters the valve assembly for piercing a valve duct opening as will be described further in connection with FIG. 23.

The inner check valve comprises a neck portion of elastomeric material molded integrally with the shell 1b and having a larger neck portion 3a and a smaller neck portion 3b, the latter comprising the inner check valve closure means. When the assembly shown in FIG. 4 has been completed, and the parts bonded together, both check valves 2 and 3 are pierced simultaneously along the line P extending from the innermost end of the neck portion 3b, through the outer element 4, and through the plug 6.

Figure 1:
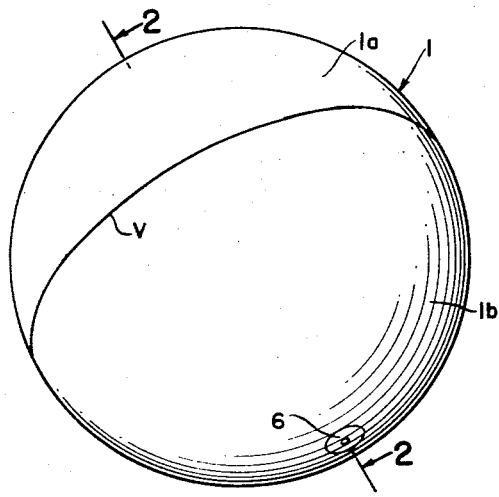
FIG. 1 is an elevation view of a completed go-devil in the shape of a ball according to the present invention showing the outer surface of a valve, and showing the bond line about which the shell sections forming the ball were united.
Figure 2:
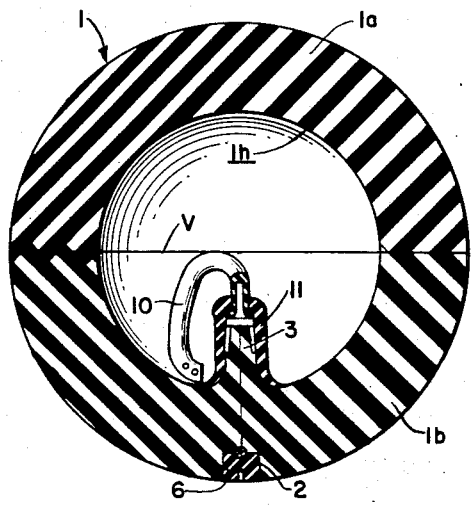
FIG. 2 is a section view taken along line 2—2 of FIG. 1.
Figure 4:
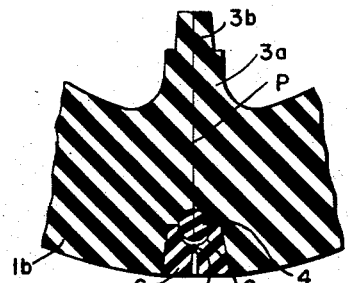
FIG. 4 is a view similar to FIG. 3 but showing both inner and outer check valve assemblies completed.
Figure 6:
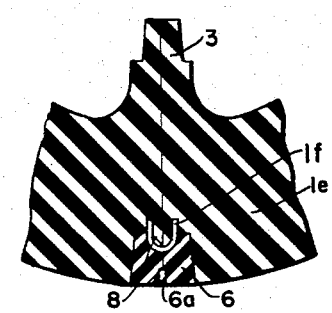
FIG. 6 is a view similar to FIG. 4 but showing a modified form of the outer check valve.

FIG. 6 shows an alternative structure in which the inner check valve 3 is the same as that shown in FIGS. 2 and 4, but in which the outer check valve eliminates the element 4 and employs a small conoidal finger 8 which is integral with the shell section 1e made in a modified mold which forms the finger 8 simultaneously with the shell of the ball and provides it with an annular groove 1f so as to permit pressure entering through the slit in the plug 6 to substantially surround the finger 8 and collapse it against entry of fluid from outside the ball. Piercing of this modification is done in the same manner as was just described with respect to the piercing of FIG. 4, namely by driving a needle through the bore 6a, through the plug 6, through the finger 8, through the shell of the go-devil, and through the internal neck 3 comprising the inner check valve.

Figure 7:
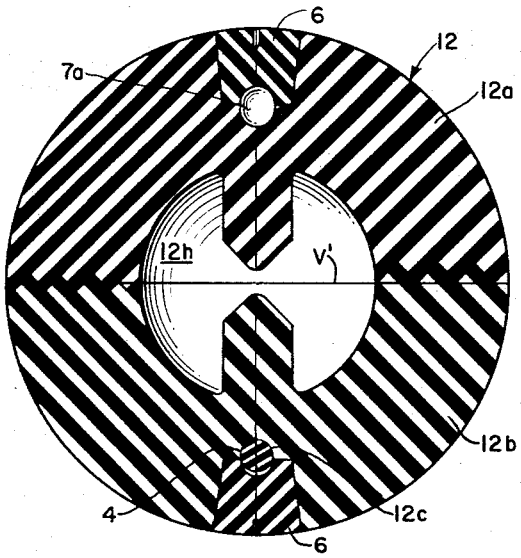
FIG. 7 is a view similar to FIG. 2 but showing a modified form of the ball in which two complete check valve assemblies are provided in opposite shells of the ball, and in which the small outwardly facing check-valve element is included in the lower check valve assembly but omitted from the upper check valve assembly to show the elongated shape of the cavity in which it is normally housed.

After the valve assembly has been completed, but before the two shells 1a and 1b are united along the plane U, the vent assembly including the tube 10 and the sleeve 11 are placed over the inner valve neck portion 3a to which the sleeve 11 is bonded. The ball is then united and bonded along the plane U. FIG. 7 shows a modified go-devil including a body 12 having an upper shell 12a and a lower shell 12b which are united together along a plane V'. Each assembly uses the same plug 6 and valve element 4 to form the outer check valve wherein the element 4 is bonded along its inner surface to a recess 12c on the shell 12b. The go-devil shown in FIG. 7 includes two valve assemblies, the lower one showing the element 4 in place to prevent undesired entry of fluid into the hollow center 12h and this go-devil also having an upper valve assembly in which the element 4 has been omitted merely for illustrative purposes to show the shape of the recess 7a into which the element would normally be inserted. This upper valve assembly includes a plug 6, and also represents another possible modification showing how a valve assembly can be made in which it is not desired to have the outer check valve operative to prevent entry of fluid into the ball from a higher pressure zone outside thereof. In other words, the structure shown at the top of FIG. 7 can be used to make a ball which has the strength of a complete assembly but in which the outer check valves are of another configuration, intended for use with gas-filled balls requiring no liquid-draining duct work. Although FIG. 7 illustrates two dual check valve assemblies, it is to be understood that any other total number thereof can be used in a go-devil.

Figure 8:
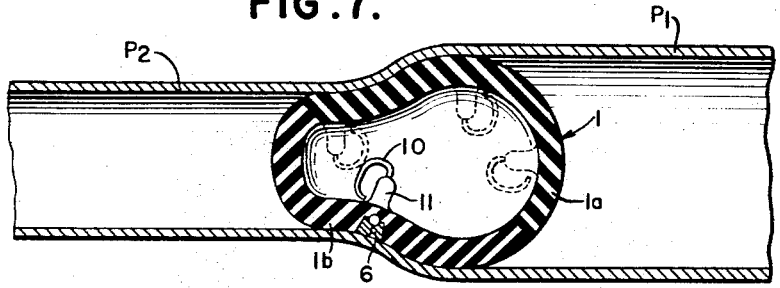
FIG. 8 is a view of a ball according to the present invention passing through a pipeline in which the diameter of the pipeline changes.

FIG. 8 shows in cross-section a pipeline having a larger diameter P1 and a smaller diameter P2, and a go-devil 1 which is distorted while passing from one diameter to the other in the pipeline. This view shows the tube 10 and the sleeve 11 in several dotted positions to illustrate that the ball can be severely distorted without damaging the venting means against one of its side walls. FIG. 8 also illustrates that the plug 6 can be distorted along with the walls 1a and 1b so as to leave the resilience of the ball substantially unaffected by the presence of a valve through its side wall.

Figure 9:
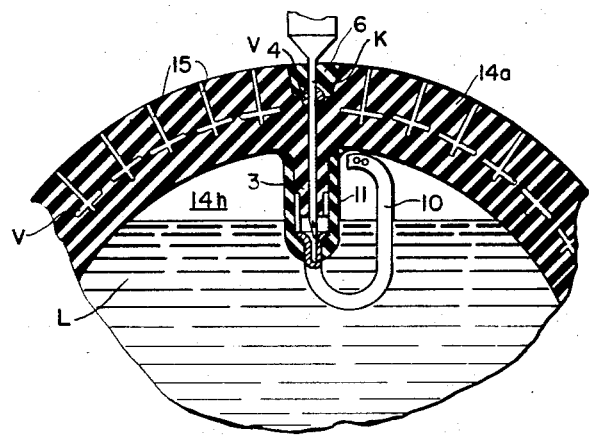
FIG. 9 is a cross-sectional view of a ball similar to the one shown in FIG. 2, but showing the ball filled almost full of liquid introduced through a hollow needle inserted through the valve assembly and communicating with the duct means, the outside of the ball having been pierced in a number of places to permit gases and voids to escape.

FIG. 9 shows a go-devil substantially identical to the assembly shown in FIG. 2 but including a shell 14a which has been pierced to form a pattern of thin slits 15, some of which extend through voids V and vent these voids to the outside. A hollow needle K is shown inserted into the interior of the go-devil through the valve assembly including the plug 6, the valve element 4 and the inner valve assembly 3, and communicating with the tube 10 held in place by the sleeve 11. The go-devil is shown substantially filled with a liquid L which is inserted through the needle K. The air within its central opening 14h can be removed so as to allow entry of the liquid thereinto either by initially drawing a vacuum on the inside of the ball 14h and then allowing liquid to flow in through the needle K, or else by alternating the function of the needle between removing air and introducing the liquid until the desired level has been obtained. It may be desirable to leave a little bit of air in the ball so as to increase somewhat the ease with which it can be distorted in the pipeline.

Figure 10:
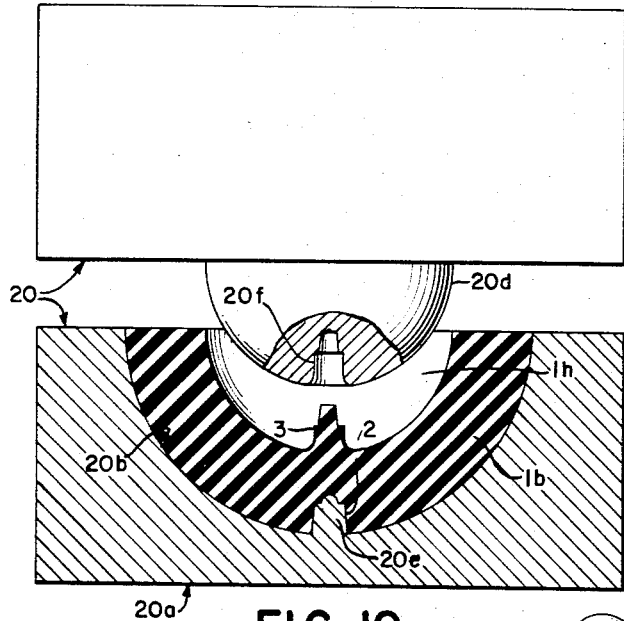
FIG. 10 is an elevation view partly in section of the upper and lower portions of a mold for molding a half-shell section.

The first step in making pipeline go-devils of the type described above includes the step of molding the shell sections of the ball using a mold 20 of the type shown in FIG. 10, including a lower mold portion 20a having a cavity 20b, and including an upper mold section 20c having a downwardly extending core 20d.

The lower mold section 20a has a boss 20e extending upwardly in order to form the socket 2 in the ball section 1b, and the core 20d of the upper mold section 20c has a cavity 20f shaped to form the neck portion 3 which extends into the cavity 1h of the ball.

The upper half of the go-devil ball can be molded in the same mold 20 as the lower half if it is desired to provide a two-section go-devil as shown in FIG. 7, or alternatively, another mold can be supplied having two sections similar to the mold 20, but lacking the boss 20e in the lower mold section 20a and lacking the cavity 20f in the core 20d.

Figure 11:
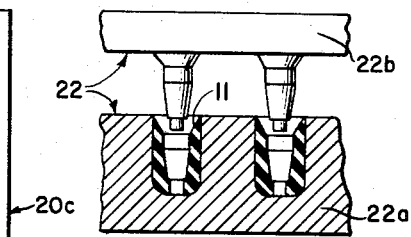
FIG. 11 is a view of a mold for molding a sleeve serving to hold a vent tube on the neck of a valve.
Figures 14, 15:
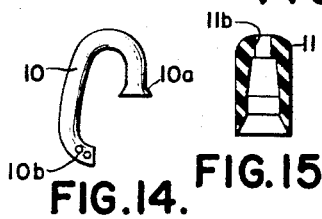
FIG. 14 is an elevation view of a shaped vent tube.
FIG. 15 is a cross-sectional view of a tube supporting sleeve.

FIG. 11 shows a mold 22 comprising a lower female section 22a and an upper male section 22b, mutually shaped to mold the coupling sleeve 11 illustrated in FIGS. 2 and 15.

Figure 12:
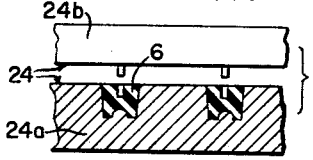
FIG. 12 is a view partly in section of a mold for molding several plugs of the type used in the outer valve assembly.

FIG. 12 shows a mold 24 having female and male sections 24a and 24b for molding the plugs 6 which fit into the sockets 2.

The small outer valve elements 4 are molded in a mold 26 having upper and lower sections 26a and 26b.

Figure 5:
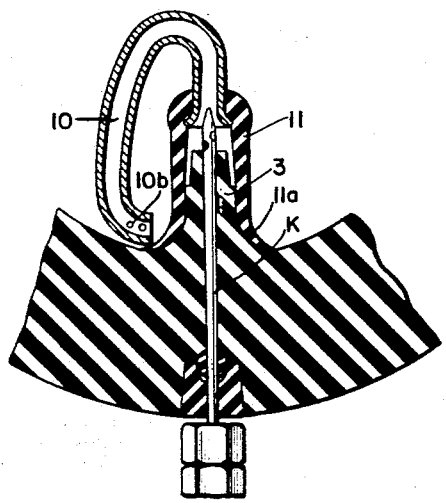
FIG. 5 is an enlarged view similar to FIG. 4 but showing drainage duct means attached to the neck of the inner check valve assembly and showing a hollow needle inserted through the valve assemblies and through the center of the valve element.
Figure 16:
FIG. 16 is a view partly in section showing a vent assembly including a tube and a sleeve.
Figure 17:
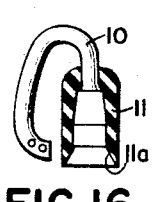
FIG. 17 is an exploded view partly in section showing a portion of a ball having a valve neck wetted with bonding liquid and showing the vent assembly about to be placed on the neck.
Figure 18:
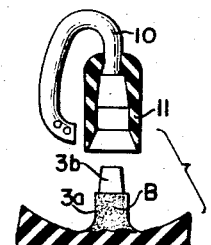
FIG. 18 is a view similar to FIG. 17 but showing the vent assembly placed on the neck and an outer check valve element being brought into position.

The molds 20, 22, 24, and 26 supply all of the elastomeric parts necessary to make a go-devil, but in addition a length of tubing 10 must be cut, bent and flared at one end as at 10a in order to complete the parts necessary for forming the complete assembly. The tubing may also be drilled as shown at 10b in order to be sure that the mouth of the tubing in the vicinity of these holes cannot be closed by contacting the lower skirt portion 11a of the sleeve 11 as shown in FIG. 5. The tubing 10 is then inserted in the small bore 11b in the sleeve 11 so that it occupies the position shown in FIG. 16, and the larger neck portion 3a is wetted with bonding liquid B as shown in FIG. 17 and the sleeve 11 is pressed downwardly onto the neck portion 3a so as to spread the lower skirt 11a of the sleeve 11 as shown in FIGS. 5 and 18. The neck 3 is stepped downwardly in diameter as at 3b so as to provide a flexible valve portion which is normally exposed to pressure on all sides except one, so that the fluid pressure within the ball will squeeze the valve portion 3b to close the pierced opening P extending therethrough. The valve portion 3b does not touch the sleeve 11, and is spaced inwardly therefrom.

Figures 19, 20:
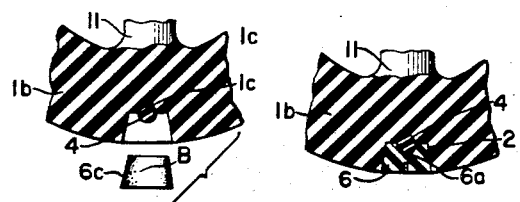
FIG. 19 is another similar view with the outer check valve element in place and the plug coated and brought toward the cavity in which it is to be bonded.
FIG. 20 is a view similar to FIG. 19 but showing the plug and element in place.
Figure 21:
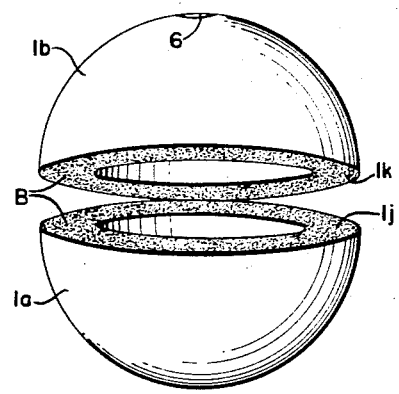
FIG. 21 is an exploded view showing upper and lower shell sections of the ball being brought together.

The outer valve is then assembled by wetting a portion of the surface of the valve element with bonding liquid B, FIG. 18, and inserting the element 4 into the position shown in FIG. 19 with the bonding liquid B in contact only with the recess 1c so that only the upper hemisphere of the element will bond with the rubber in the recess 1c, but not bond with the rubber of the plug 6. This plug 6 is then coated with bonding liquid B on its conical surface 6c and inserted in the socket 2 so that the plug bonds with the rubber of the ball half 1b. No bonding liquid B is put into the recess 6a of the plug 6 or on the surface of the element 4, thereadjacent, so that this element is never bonded to the plug. With the valve assembly completed as shown in FIG. 20, the valved half of the ball may then be subjected to further heat so as to complete the bonding and curing of the inner and outer valve and duct assemblies, and then the valved half is placed on a press and a sharp needle N supported in a chuck C is driven downwardly through the plug 6, the element 4, the rubber shell 1b and the inner valve neck 3b to complete the manufacture of the inner and outer valve assemblies. The two go-devil shells 1a and 1b are then treated on their mating surfaces 1j and 1k, by grinding or buffing these surfaces so that they are true planes. The surfaces are then wetted with bonding liquid B and are united as shown in FIG. 22 to form a complete go-devil.

There are several ways of insuring a very tight bond, one or more of which ways can be used to advantage. One way of insuring a tight bond between surfaces 1j and 1k is to insert a hollow needle K through the valve assemblies as shown in FIG. 5 and evacuate air from within the space 1h, thereby permitting atmospheric pressure to tightly squeeze the sections of the ball together. It has been found advantageous to put a narrow metal band D around the break line between the shell sections so as to hold these halves in alignment. With the halves thus aligned and evacuated, the go-devil should be heated to insure that all bonds made using bonding liquid B are cured by the combined heat and pressure. Another good way of accomplishing the purpose while insuring a satisfactory final shape for the go-devil is to insert it into a mold having a hollow cavity, and then heat the ball inside the mold to cure the bonds.

It has been found to be advantageous to use a somewhat harder rubber in the plug 6 than in the remainder of the shell sections, which in order to reduce the tendency of the pierced portion P through the plug 6 to be distorted open when the go-devil is severely distorted, for instance as shown in FIG. 8.

Figure 13:
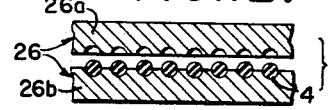
FIG. 13 is a view in section of a mold for molding a series of resilient check-valve elements each of which is suitable for use in an outer check valve assembly.

If a go-devil of the type shown in FIG. 6 is to be made by the present method, the shape of the boss 20e in FIG. 10 would be changed so as to mold the finger 8 integrally with the ball section 1e. In this case, the steps shown in FIGS. 13 and 18 with respect to making the ball 4 and bonding it into the recess 1c can be eliminated. It is believed that the modification of the above process required to make a ball of the type shown in FIG. 7 need not be discussed in detail since it merely eliminates the steps called for in FIGS. 11, 14, 15, 16, and 17.

In relaxed condition the ball is spherical in contour, and this spherical contour is retained when the ball is inflated beyond its relaxed size by internally pressurizing it. FIGS. 24, 25, and 26 show a ball section and valve assembly similar to that shown in FIGS. 3 and 4, but in various stages of distortion due to ball inflation. FIG. 24 shows the ball inflated to about 25% greater diameter; FIG. 25 shows the ball inflated to about 50% greater diameter; and FIG. 26 shows the ball inflated to about 100% greater diameter. The ball 4 and plug 6 are likewise distorted, not only by external fluid pressures, but also by the stretch and pull of the elastomeric material of the ball to which it is bonded, but the pierced opening still remains closed and sealed. The degree of stretch of the valve element 4 depends also on its radial position in the wall of the ball 1, but it should not stretch far enough to open the pierced passage therethrough. The valve element 4 may advantageously have a durometer hardness falling in a range between that of the ball and that of the plug 6, and of course it need not be spherical in shape, although this is a good shape because fluid pressures external of the ball can act upon the outer surface of the valve element 4 to squeeze the slit therethrough closed.

If the ball is to be pierced part-way through its outer walls as shown in FIG. 9 so as to vent possible voids V, this piercing would be done after the ball is otherwise assembled, and heat cured. This piercing is carried out according to the disclosure of my Patent 3,036,339, using a sharp needle, or a plurality of such needles supported on a mounting.

The present invention is not to be limited to the exact practical examples illustrated in the drawings and discussed in the specification, for obviously the novel structures and method steps can be used to provide pipeline go-devils having shapes other than spherical shapes and having combinations of less than all of the features illustrated and described. The present invention is described in the following claims.

What is claimed is:

1. A pipeline go-devil comprisng:
   (a) a hollow elastomeric ball having inner and outer surfaces separated by thick walls;
   (b) an elastomeric neck portion formed integrally with the body and extending inwardly from the inner surface, the neck portion being long as compraed with its thickness and tapering down to an inner end of thickness less than said wall thickness, the body having a socket extending into and part-way through its wall from the outer surface and located in alignment with said neck portion;
   (c) an elastomeric element at the inner end of the socket and extending outwardly therefrom to provide a conoidal surface;
   (d) an elastomeric plug bonded in and substantially filling the socket flush with the surface of the ball and having in its inner end a clearance recess sized and shaped to provide clearance for the conoidal surface of said element, the plug and the valve element and the body and the neck portion all having a slit pierced therethrough to provide a self-closing valve action at the neck portion to prevent escape of fluid pressure from within the ball and at the valve element to prevent entry of fluid pressure into the ball.

2. In a go-devil as set forth in claim 1, sleeve means attached to the body at one end and surrounding the neck portion and the other end of the sleeve being spaced from the free end of the neck portion and having fixed therein drainage tube means with an open end disposed adjacent the inner surface of the go-devil.

3. A pipeline go-devil comprising a hollow elastomeric body having inner and outer surfaces separated by walls of substantial thickness and the body having at least one hollow recess contained within a wall; an elastomeric neck portion formed integrally with the body and extending inwardly from the inner surface and located adjacent to said hollow recess, and the body having a finger located in the recess and extending in the opposite direction from said neck portion, the recess being sized and shaped to provide clearance for the finger on all of its surfaces except where it joins the body and the body and the finger and the neck portion all having a slit pierced therethrough providing a self-closing valve action at the neck portion to prevent escape of fluid pressure from within the go-devil and at the finger to prevent entry of fluid pressure into the go-devil; and sleeve means attached to the body at one end and surrounding the neck portion and the other end of the sleeve being spaced from the free end of the neck portion and having fixed therein drainage tube means with an open end disposed adjacent the inner surface of the go-devil.

4. A pipeline go-devil comprising:
   (a) a hollow elastomeric body having inner and outer surfaces separated by walls of substantial thickness;
   (b) an elastomeric neck portion formed integrally with the body and extending inwardly from the inner surface, and the body having a socket extending into the wall from the outer surface and located in alignment with said neck portion and the body having a recess located in the inner end of the socket;
   (c) an ealstomeric valve element located and bonded in said recess;
   (d) a plug fixed in and substantially filling the socket and having in its inner end a recess sized and shaped to provide clearance for the element on all of its surfaces except where it joins the body, the plug and the element and the body and the neck portion all having a slit pierced therethrough to provide a self-closing valve action at the neck portion to prevent escape of fluid pressure from within the go-devil and at the element to prevent entry of fluid pressure into the go-devil; and
   (e) sleeve means attached to the body at one end and surrounding the neck portion and the other end of the sleeve being spaced from the free end of the neck portion and having fixed therein drainage tube means with an open end disposed adjacent the inner surface of the go-devil.

5. A pipeline go-devil comprising:
   (a) a hollow elastomeric body of one hardness and having inner and outer surfaces separated by walls of substantial thickness;
   (b) an elastomeric neck portion formed integrally with the body and extending inwardly from the inner surface, and the body having a socket extending into the wall from the outer surface and located in alignment with said neck portion and the body having a finger located in the inner end of the socket and extending part-way outwardly from the end of the socket;
   (c) an elastomeric plug of a greater hardness fixed in and substantially filling the socket and having in its inner end a recess sized and shaped to provide clearance for the finger on all of its surfaces except where it joins the body, the plug and the finger and the body and the neck portion all having a slit pierced therethrough to provide a self-closing valve action at the neck portion to prevent escape of fluid pressure from within the go-devil and at the finger to prevent entry of fluid pressure into the go-devil; and
   (d) sleeve means attached to the body at one end and surrounding the neck portion and the other end of the sleeve being spaced from the free end of the neck portion and having fixed therein drainage tube means with an open end disposed adjacent the inner surface of the go-devil.

6. The method of making a pipeline go-devil including the steps of
   (a) molding plural mating hollow elastomeric shells, and providing one thereof with a neck portion extending inwardly from its inner surface and a socket directly opposite the neck portion and extending inwardly from the outer surface of the shell;
(b) molding an elastomeric plug and shaping it to fit within and fill the socket and having a hollow recess in its inner surface;
(c) providing an elastomeric finger in the socket-extending outwardly of the shell and having a conoidal surface loosely fitting within said recess;
(d) bonding the plug to the walls of the socket;
(e) piercing the socket, the finger, the shell and the neck portion to form a self-closing slit therethrough;
(f) molding an elastomeric sleeve and shaping it to fit over the neck portion but spaced from its outer end;
(g) bonding the sleeve to the shell in a position surrounding the neck portion;
(h) placing a tube from the outer end of the sleeve to a point adjacent the inner surface of the shell;
(i) uniting the mating shells to form a hollow go-devil; and
(j) curing the go-devil bonds.

References Cited
UNITED STATES PATENTS

| | | |
|---|---|---|
| 2,304,776 | 12/1942 | Brunner. |
| 2,387,433 | 10/1945 | Fenton _____ 273—65 |
| 2,965,114 | 12/1960 | Harden _____ 15—104.06 X |
| 3,065,763 | 11/1962 | Howard _____ 137—223 |
| 3,100,498 | 8/1963 | Gibson _____ 273—65 X |

FOREIGN PATENTS

| | | |
|---|---|---|
| 242,960 | 3/1960 | Australia. |
| 546,736 | 9/1957 | Canada. |
| 930,330 | 8/1947 | France. |

M. CARY NELSON, *Primary Examiner.*

H. KLINKSIEK, *Assistant Examiner.*